United States Patent [19]

Agnew et al.

[11] 3,898,432

[45] Aug. 5, 1975

[54] READ/WRITE MACHINE FOR MAGNETIC STRIPPED DOCUMENT CARD

[75] Inventors: Mark Charles Agnew; John Edward Savage, Jr.; Thomas Oren Turner, all of Rochester, Minn.

[73] Assignee: International Business Machines Corporation, Armonk, N.Y.

[22] Filed: June 20, 1973

[21] Appl. No.: 371,789

[52] U.S. Cl. .......... 235/61.11 D; 360/2; 235/61.7 B
[51] Int. Cl. .......... G06k 7/08; G11b 15/29
[58] Field of Search .......... 235/61.11 D, 61.7 B; 179/100.2 CA, 100.2 MD; 340/174.1 R; 360/2, 74, 88

[56] References Cited

UNITED STATES PATENTS

| | | | |
|---|---|---|---|
| 3,064,886 | 11/1962 | Holladay | 235/61.11 D |
| 3,508,032 | 4/1970 | MacDuffee et al. | 235/61.11 D |
| 3,530,448 | 9/1970 | Clancy et al. | 360/53 |
| 3,588,379 | 6/1971 | Young et al. | 235/61.11 D |
| 3,671,719 | 6/1972 | May | 235/61.11 D |
| 3,706,860 | 12/1972 | Burbank | 235/61.11 D |
| 3,737,884 | 6/1973 | Wallace | 235/61.11 D |
| 3,810,238 | 5/1974 | Staar | 360/74 |
| 3,831,188 | 8/1974 | Zupancic et al. | 360/2 |

*Primary Examiner*—Stanley M. Urynowicz, Jr.
*Attorney, Agent, or Firm*—Keith T. Bleuer

[57] ABSTRACT

A read/write machine for a document card having a strip of magnetic material thereon, the machine including a magnetic read/write head and a pair of nipped rolls between which the card moves for transporting the card and particularly its stripe of magnetic material over the read/write head. Controls are included for selectively returning the card to its original position in the machine after a reading or writing operation has occurred for allowing the operator to remove the card from the machine, or alternately automatically moving the card in a second pass over the head in the same direction as the first pass of the card thereover so that any data written on the card during its first passage over the head may be read therefrom by the head, or alternatively causing the card to move in three forward passes through the machine, with the third pass being used for checking the magnetic bits as previously recorded and previously read during previous forward passes of the card through the machine.

3 Claims, 9 Drawing Figures

READ/WRITE MACHINE FOR MAGNETIC STRIPPED DOCUMENT CARD

BACKGROUND OF THE INVENTION

The invention relates to a read/write machine for document cards and more particularly to a machine of this type utilizing document cards carrying a magnetic stripe on a face thereof.

It has been previously proposed that document cards may have information recorded thereon or may have such information read therefrom on a single pass of such a document card across a read or write station.

It is an object of the present invention to provide a machine for reading and/or writing information on document cards, particularly those carrying a magnetic stripe on a face of the card, in which the card after having information recorded thereon or read therefrom, is automatically returned to its initial position at which the card is originally inserted into the machine, so that the card may be easily removed from the machine.

It is another object of the invention to provide a machine of this type which automatically moves the card in a second pass through the machine in the same direction in which the card was initially moved through the machine, with the same read/write magnetic head being used to read information from the card that was recorded thereon during the previous pass of the card through the machine.

It is a still more particular object of the invention to provide a machine of this type which automatically moves the document card in a third pass through the machine in the same directions as those in which the first and second passes took place so that information recorded on the card during the first pass is again read from the card for checking purposes, for example.

In a preferred form, the machine of the invention includes a pair of nipped rolls one of which is motor driven for transporting a document card across a read/write head as the drive roll is driven. During a first pass through the machine, information is recorded by the read/write head on a stripe of magnetic material carried by the card, and the machine automatically returns the card to its initial position, all the while holding the card in the nip between the two rolls. The machine thereafter, under selective control, may again move the card through the machine in the same direction as the first pass of the card through the machine for at this time reading any information on the magnetic stripe of the card that was recorded thereon during the first pass of the card through the machine. In addition, the machine includes means for automatically moving the card in a third pass through the machine from the initial position of the card during which pass the information recorded on the magnetic stripe during the first pass may be again read therefrom for checking purposes, for example.

BRIEF DESCRIPTION OF THE DRAWINGS

Referring to FIG. 1, the document card 20, with which the machine of the invention is adapted to be used, may be seen to be oblong in shape and to have relatively long sides *a* and relatively short ends *b*. The card 20 has a corner cut 22, and a magnetic stripe 24 is provided on one face. As the card 20 is illustrated in FIG. 1, the stripe 24 is located on the lower face of the card, and printing 26 may be on the upper face of the card. The card is made of relatively thick cardboard having substantial stiffness; the card, for example, may have a thickness of about 0.007 inch.

Figure 2:
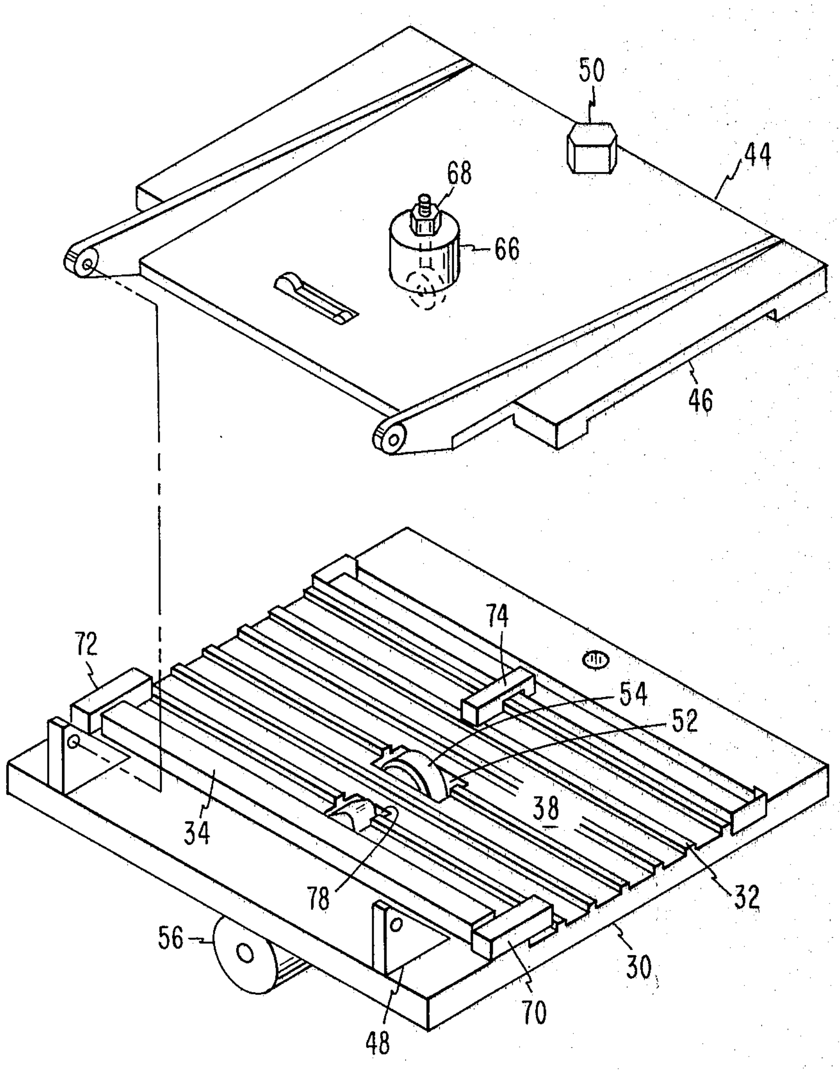
FIG. 2 is an exploded view of document card transport mechanism contained within the machine.
Figure 3:
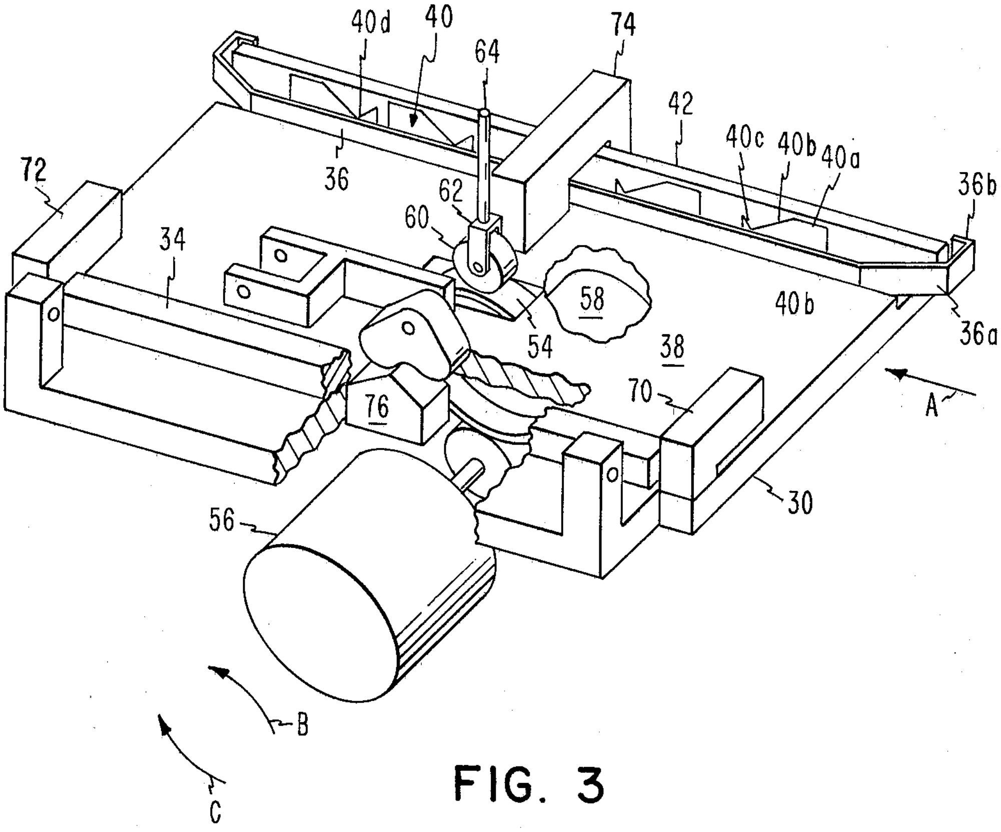
FIG. 3 is a perspective view of this transport mechanism.

Referring in particular to FIGS. 2 and 3, the magnetic read/write card machine 28 of the invention may be seen to comprise a bed plate 30 having ribs 32 on it upper surface extending longitudinally of the bed plate 30. A guide rail 34 is fixed adjacent one edge of the bed plate 30, and a floating pressure rail 36 is provided adjacent the other side of the bed plate 30, defining a card channel 38 between the rails. Pressure springs 40 extend between the rail 36 and a retaining bar 42 that is fixed with respect to the bed plate 30. The springs 40 are of leaf spring stock; and each has a flat portion **40*a* fixed to the bar 42, a portion 40*b* extending at angles with respect to the portion 40*a* and a portion 40*c* extending at angles with respect to the portion 40*b* so as to provide a ridge or apex 40*d* that bears against the surface of the floating rail 36. The rail 36 has end portions 36*a* that extend at acute angles with respect to the main central portion of the rail 36 and has return bent portions 36*b* that overlie the bar 42 for limiting the motion of the rail 36 toward the rail 34 under the action of the springs 40**.

A transport cover 44 overlies the card channel 38 and has a longitudinal slot 46 in it in correspondence with channel 38. The cover 44 is hinged on standards 48 fixed to the bed plate 30 and is held in position overlying the bed plate 30 by any suitable means, such as a stud 50 extending through a pair of corresponding holes formed in cover 44 and bed plate 30.

The bed plate 30 is provided with an oblong opening 52 cut through it, and a feed roll 54 extends through the opening 52. The roll 54 is driven from a drive motor 56 that is fixed onto the lower surface of the bed plate 30 in any suitable manner. A motor speed controller or tachometer 58 is mechanically coupled with the motor 56 and is also fixed on the lower surface of the bed plate 30.

A pressure roll 60 is positioned above and has a pressure nip with the feed roll 54. The roll 60 is rotatably disposed in a trunnion 62 fixed on a shaft 64, and the shaft 64 is disposed in and extends through a cylindrical boss portion 66 formed on the upper surface of the transport cover 44. The stud 64 may be threaded in to the boss portion 66 so that the pressure roll 60 may be held with a finely adjustable pressure nip with the roll 54, and a lock nut 68 may hold the stud 64 and roll 60 in the desired adjusted positions.

A first photo device or card sensor 70 is fixed to the bed plate 30 at the forward end of and at one side of the card channel 38; a third photo device or card sensor 72 aligned with the sensor 70 is fixed to the bed plate 30 at the rear end of the card channel 38; and a second photo device or card sensor 74 is fixed to the card bed 30 on the other side of the card channel 38. The sensor 74 lies just slightly rearwardly of a vertical plane through the axis of rotation of the rolls 54 and 60 in the channel 38. The card sensors are of any suitable type, such as including light emitting diodes; and all of them overlie the channel 38 to some extent so that the card 20 as it passes beneath the sensors 70, 72 and 74 is detected by the sensors.

A read/write head 76 is fixed with respect to the bed plate 30 and extends through an elongated opening 78 in the head 30. The head 76 has a rounded upper end portion 80 which protrudes slightly above the uppermost surfaces of the ribs 32. The head 76 is of conventional construction and includes the usual gap 82 dividing parts of the surface over which the magnetic medium passes, the surface being in this case the rounded end portion 80. The gap 82 is in substantial alignment with a plane extending through the centers of rotation of the rolls 54 and 60.

Figure 4:
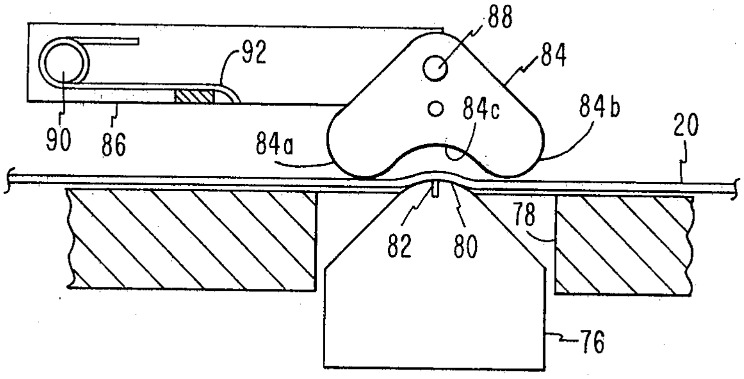
FIG. 4 is a side elevational view of a read/write head contained in the machine together with a pressure pad located above the head for holding a document card firmly in contact with the head.

A pressure pad 84 is disposed above the head 76 for holding the card 20 and particularly its magnetic stripe 24 in forceful relationship with the curved surface 80 of the head 76. The pressure pad 84 is provided with a pair of rounded lower portions 84*a* and 84*b* separated by a groove 84*c*. The rounded portions 84*a* and 84*b* are on opposite sides of the head 76 as shown in FIG. 4, and the groove 84*c* is disposed directly above the rounded portion 80 of the head 76.

The pressure pad 84 is pivotally mounted on the end of a swing arm 86 by means of a pivot shaft 88, and it will noted that the shaft 88 is located directly above the uppermost portion of the head 76 and the gap 82. The arm 86 is pivoted on a rod 90 fixed with respect to the rail 34, and a spring 92 is disposed about the rod 90 and is effectively connected between the arm 86 and the rail 34 so as to continuously urge the pressure pad 84 downwardly.

A housing 94 sets over the bed 30 and cover 44 and constitutes the exterior of the machine. The cover 94 has a slot 96 therein constituting a document card entry throat, and the slot 96 is in coincident relationship with respect to the channel 38 as closed on its top by means of the cover 44.

Figure 1:
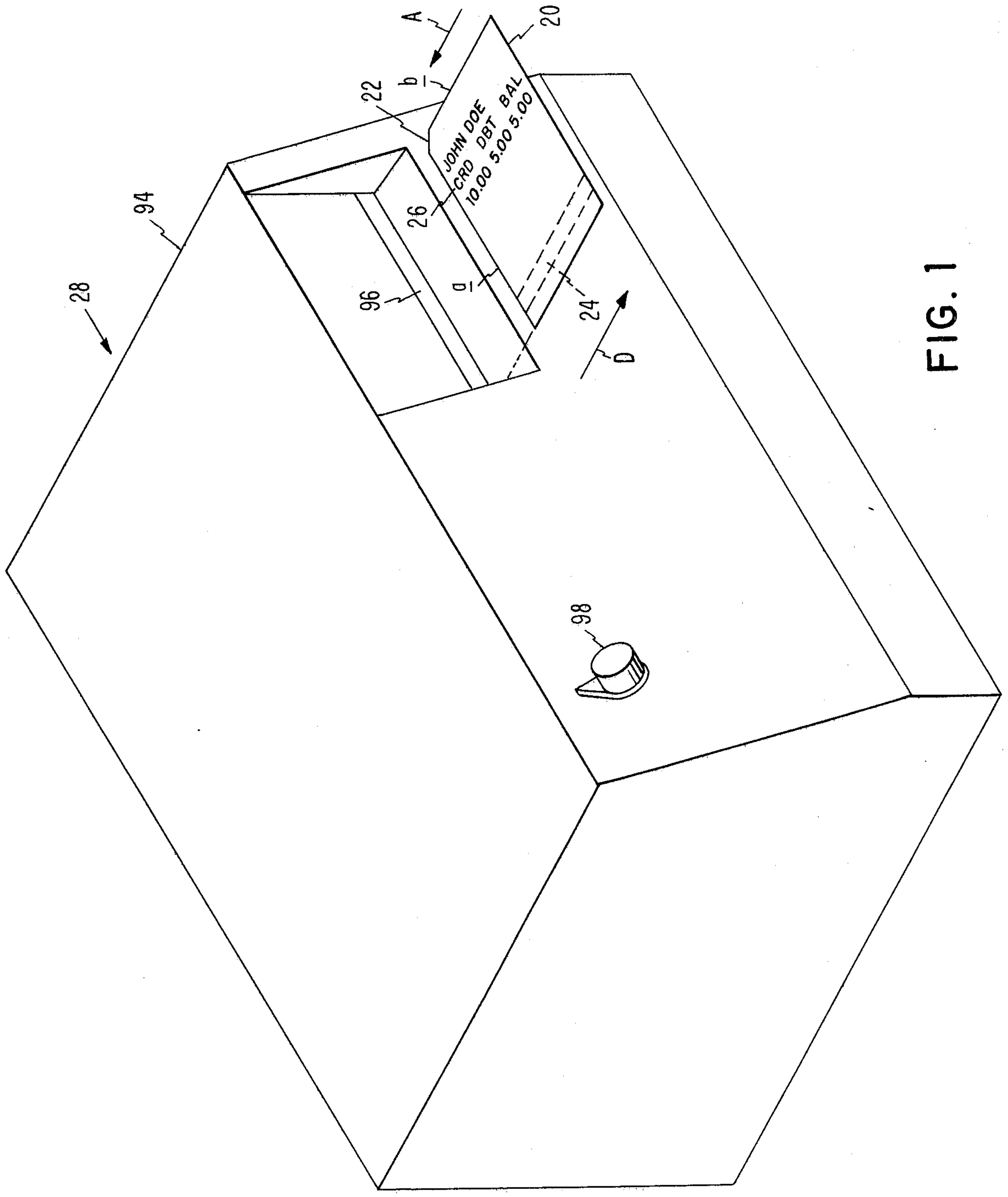
FIG. 1 is a perspective view of a read/write machine for magnetic striped document cards and illustrating such a card being inserted into the machine.

In operation, the card 20 is inserted into the slot 96 of the cover 94 in the direction indicated by the arrow A, with the magnetic stripe 24 on the bottom and on the left as the card and machine are shown in FIG. 1, and with one of the long sides *a* of the card 20 leading and entering the slot 96 first. Since the slot 96 is in alignment with the card channel 38, as the path is defined by the upper surfaces of the ribs 32 and by the lower surface of the cover 44, the card enters the channel 38 beneath the card sensor 70. Sensor 70 is thus energized, and this has the effect of starting the motor 56 in the direction B. Continued movement of the card 20 into the slot 96 and into the card channel 38 by the machine operator causes the card 20 to enter the nip between the drive roll 54 and pressure roll 60. At the instant when the card enters the nip, the card is then completely under the control of the drive roll 54 and the motor 56; and, from this instant, the card is under the complete control of the roll 54 and is not released by the rolls 54 and 60 until expulsion of the card from the machine is signaled. The card 20 may subsequently move, not only in the forward direction (the direction in which the card 20 enters the slot 96) but may also and preferably does move backwardly in the reverse direction in the card channel 38 toward the slot 96 after reaching a limited position in the forward direction.

Shortly after the leading edge of the card 20 passes through the nip of the rolls 54 and 60, the leading edge of the card 20 actuates card sensor 74. Sensor 74 signals the electrical controls to begin writing magnetic bits on the magnetic stripe 24 (or reading data on the stripe, according to the mode set by the electrical controls).

This reading of data from or writing of data on the stripe 24 is by the action of the read head 76. As the card 20 continues under the control of the rolls 54 and 60, during the reading or writing of data with respect to the magnetic stripe 24, the leading edge of the card 20 actuates the card sensor 72. Card sensor 72 has the normal function of signaling for reversal of the voltage on the motor 56 so that the motor then begins to drive in the direction C to cause the card 20 to reverse its direction of movement and retrace its path in direction D toward the slot 96. However, the machine may be so controlled so as to pass the card 20 out from the rear end of the card channel 38, and the cover 84 is provided with a slot, corresponding to the slot 96, that allows the card 20 to move in this direction out of the channel 38. In this case, the reversing function of the sensor 72 is ignored. When the card sensor 72 is functioning in its normal manner, the card 20 passes back in the channel 38 until the sensor 70 is actuated by the edge of the card 20 that was its trailing edge when the card 20 was first inserted into the machine. During this backward movement, the electrical controls are so operative that neither reading or writing of data onto or from the magnetic stripe 24 takes place.

When the machine is so configurated under the electrical controls for a read only or write only operation, the function of the card sensor 70 is inactivated as the card moves toward the insertion slot 96. The sensor 70 under these conditions thus has no action; and the card 20, after the read only or write only operation has occurred, is thrown by reason of its own inertia back out of the machine through the slot 96.

During the movement of the card 20 in the forward direction and then again back in the reverse direction to the slot 96, the aligning rail 36 holds the card 20 with an edge *b* thereof in contact with the fixed rail 34. Thus, when writing or reading takes place by the action of the head 76, this is done in a very accurately aligned band on the magnetic strip 24. As the card 20 initially enters the channel 38, the card acts on the initial slanted surface 36*a* of the rail 36 and moves the rail backwardly toward the bar 42 against the action of the springs 40. As the card enters the channel 38 to a further extent, the springs 40 compress still further and the rail 36 comes parallel with the fixed rail 34, with the springs 40 holding the card 20 firmly in engagement with the rail 34 during the further movement of the card 20 either forwardly or reversely. Once the card 20 is in place in the channel 38, the force exerted on the card 20 by the rail 36 remains constant, regardless of the position of card 20 in the channel 38, thereby providing a constant and fixed force on the card as it moves along the channel 38. This is due to the fact that the rail 36 floats under the collective pressures of the series of springs 40. The rail 36, in addition, has the function of acting as an anti-skew spring device which functions as a brake on the card 20 as the card 20 moves toward the slot 96, to only allow a portion of the card 20 to project through the slot 96 for manual retrieval.

During the read only or write only operations as just mentioned, the pressure pad 84, and particularly its rounded portions 88*a* and 88*b*, cause the card to bend around the rounded upper portion 80 of the head 76 against the stiffness of the card and cause the magnetic stripe 24 to press against the gap 82 of the head 76. The spring 92, in this connection, functions to spring load the pressure pad 84 against the document 20, acting through the swing arm 86, with the pivotal connection of the pad 84 on the arm 86 allowing the pad 84 to swivel as may be necessary to maintain the pressure of the rounded portions 84*a* and 84*b* the same with respect to the card 20. The pad 84, by pressing the document over the head 76, provides an intimate contact of the magnetic stripe on the head 76, and this intimate contact remains consistent and constant even if the document card 20 is warped or has any other geometric abnormality. This is particularly true, because the contour of the pressure pad 84 causes the document card to slightly assume the rounded contour of the head 76 in the read/write gap area at gap 82. The pivotal connection of the pressure pad 84 on the arm 86 has still another desirable function, and this occurs when the card 20 is first fed onto the head 76. At this time, the pressure pad 84 pivots about the shaft 88 in the counterclockwise direction as seen in FIG. 4, so as to facilitate the entry of the card 20 onto the head 76.

When the electrical circuitry is so set for multiple card passes, such as a read after write operation, the electrical circuitry is effective to cause both of the card sensors 70 and 72 to reverse the direction of the drive roll 54 and thereby reverse the direction of the card 20 in the channel 38. The card sensor 72 functions as before to reverse the card 20, moving it back in direction D toward the slot 96; and, in the case of multiple card passes, the sensor 70 is effective in the same manner for again moving the card 20 forwardly in direction A in the channel 38. The electrical circuitry is effective for reading from or writing on the magnetic stripe only when the card 20 is moving forwardly in the channel 38, toward the sensor 72; and no reading from or writing on the magnetic stripe 24 occurs during the reverse movement of the card 20 toward the sensor 70. On multiple card passes, as the card 20 reaches the sensor 70 on its reverse movement, the sensor 70 causes the electrical circuitry to reverse the direction of the motor 56, from direction C to direction B; and this actuation of the card sensor 70 also causes the magnetic head 76 to again begin to either write magnetic bits on the stripe 24 or to read magnetic bits recorded on the stripe 24. The circuitry, particularly the switch 98, may also be effective to cause the card 20 to move in three forward passes through the machine. The first pass may be used for writing magnetic bits on the magnetic stripe 24; the second pass may be used for reading the bits from the magnetic stripe; and the third pass may be used for checking the magnetic bits as so recorded and previously read. In all of these cases, reading and writing by the head 76 takes place only when the card is moving in the forward direction through the channel 38 toward the sensor 72.

In all the cases in which the switch 98 and connected circuitry dictates that the card shall have multiple forward passes through the machine before being expelled from the machine, the card remains within the nip of the rolls 54 and 60 and does not leave the nip before being expelled. The magnetic stripe 24 is therefore encoded by the head 76 for slightly less than the complete length of the stripe, such as one-fourth inch from each end of the stripe. Keeping the card 20 within the bite of the rolls 54 and 60 ensures that the card 20 is under complete control for all passages of the card through the channel 38, and slip and skew of the card 20 during motor accelerations after reversals are prevented. The floating guide 36 also assures that no card skewing takes place and assures that a constant force holds the card 20 against the fixed rail 34 regardless of the position the card is in within the channel 38. The band of the stripe 24 on which the head 76 is effective thus is accurately controlled as the card moves in the channel, and the machine provides for positive control of the document from the time of insertion through the slot 96 until all magnetically oriented functions have been performed with respect to the document and the electronic circuitry signals for explusion from the card from the machine. The action of the electric circuitry in writing on and reading from the magnetic stripe 24 only for one direction of movement of the card 20 through the machine assures that the reading and writing takes place the same every time. The pressure shoe 84 assures that intimate contact and constant contact pressures exist between the stripe 24 and the magnetic read/write head 76 continuously from the time the card 20 first passes under the shoe 84 until the card is expelled from the transport, providing a more constant signal output from the head 76 than could be possible in a device in which a card leaves contact with a read/write head prior to subsequent read/write operations. The electrical circuitry allows the speed of the motor 56 to be controlled by the operator so that he may match the speed of reading and writing with the speed of the equipment with which the read/write machine is being used.

Figure 5:
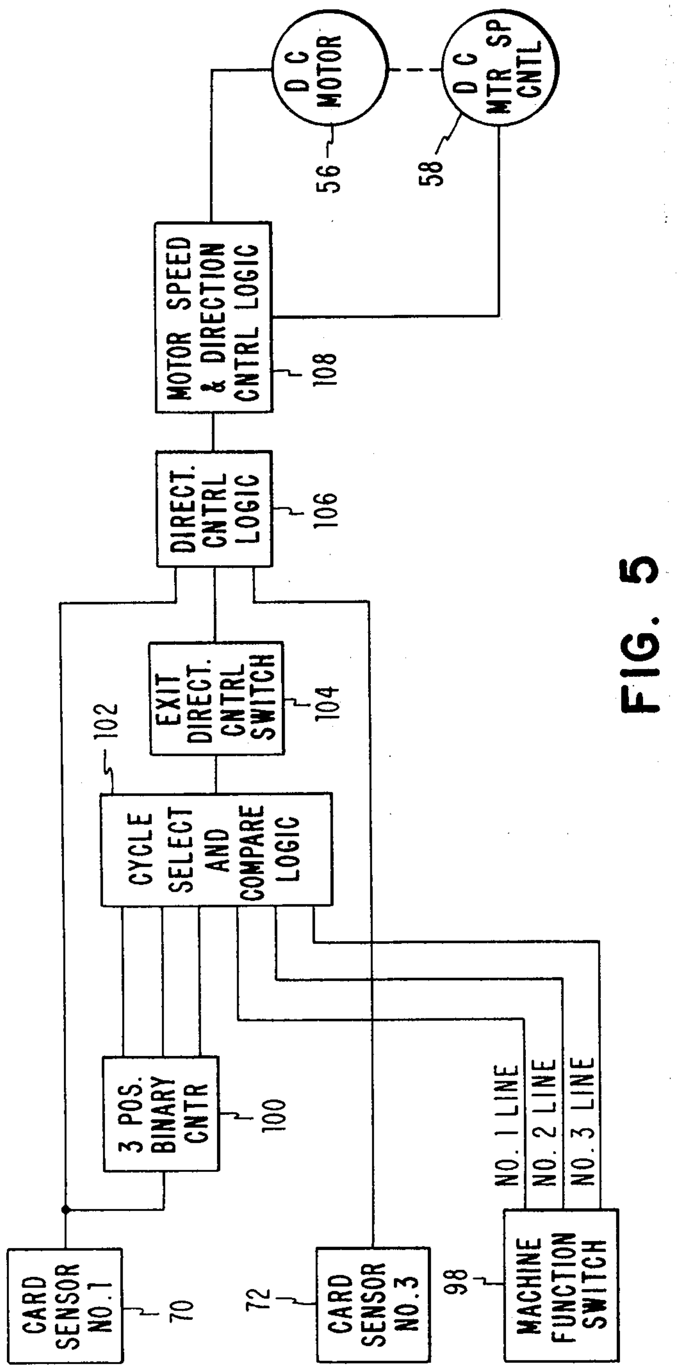
FIG. 5 is a diagrammatic illustration of circuitry used in connection with the machine.

The machine function switch 98 (see FIGS. 5 and 7*a*) is preferably carried by the cover 94 and is accessible from the exterior of the machine. In addition, referring to FIG. 5, the electrical controls include a three state binary counter 100 connected with the card sensor 70, cycle select and compare logic 102 which is connected with the counter 100 and with the machine function switch 98, an exit direction control switch 104 connected to be controlled by the cycle select and compare logic, direction control logic 106, and motor speed and direction control logic 108 for controlling the motor 56.

Figure 7A:
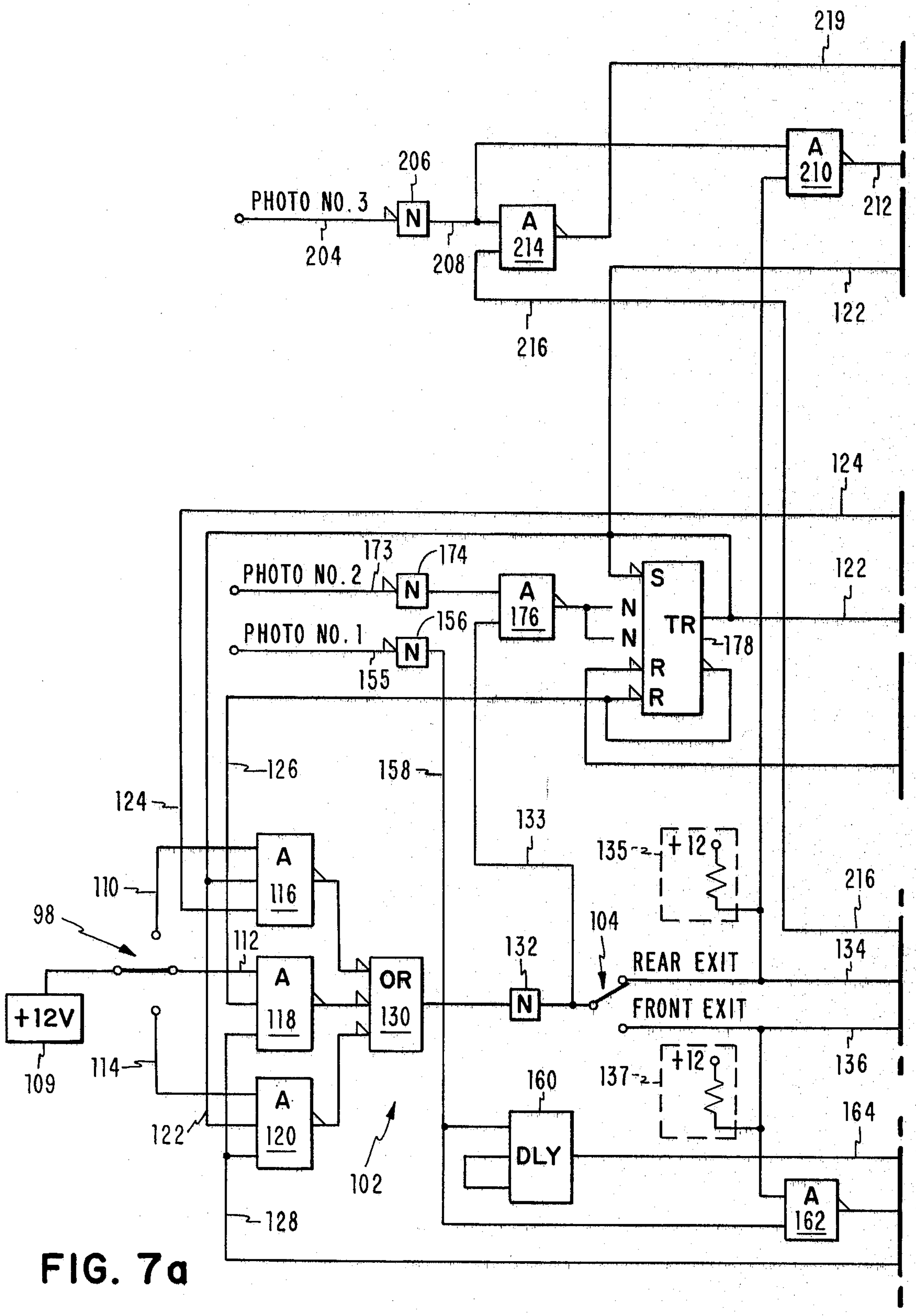
FIGS. 7*a* and 7*b*, when placed together with FIG. 7*a* on the left and FIG. 7*b* on the right constitute a diagram of controlling logic for the FIG. 6 logic.
Figure 7B:
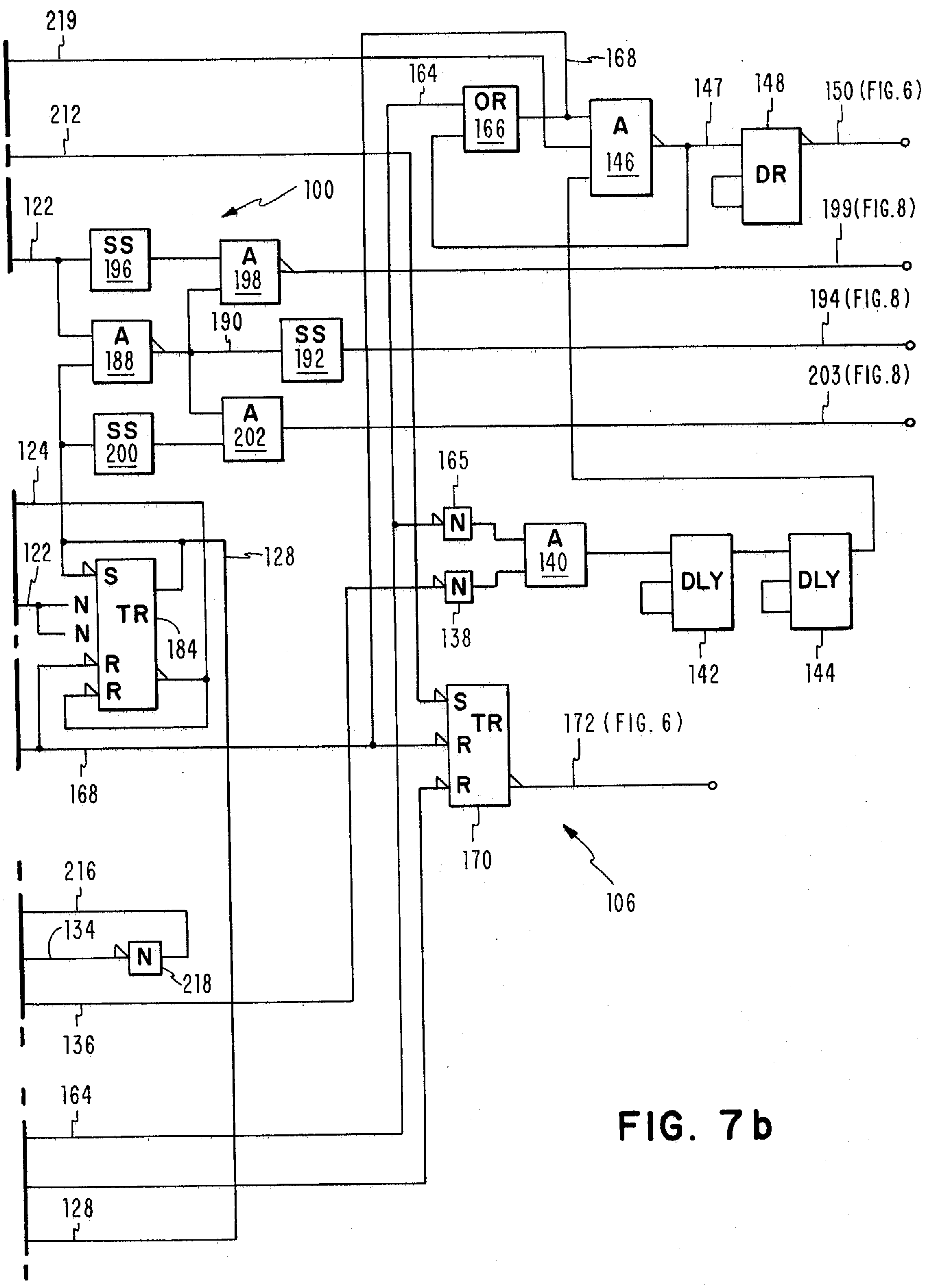

Referring to FIGS. 7*a* and 7*b*, the function switch 98 may be seen to be connected with a voltage source 109 and to have three output lines 110, 112 and 114; and these lines are respectively connected as inputs to AND circuits 116, 118 and 120. The AND circuit 116, in addition, has input lines 122 and 124, and the line 122 also constitutes an input to AND circuit 120. The AND circuit 118 also has input lines 126 and 128, and the line 128 also constitutes an input to AND circuit 120.

The outputs of the AND circuits 116, 118 and 120 are connected to an OR circuit 130, the output of which is connected through an inverter 132 and line 133 with the switch 104. The switch 104 is a two-position switch and has an output line 134 to which a voltage source 135 is connected. The switch 104 also has an output line 136 to which a voltage source 137 is connected. The line 136 is also connected to an inverter 138, the output of which is connected to an AND circuit 140. The AND circuit 140 is connected through delay circuits 142 and 144 with an AND circuit 146 to constitute an input thereto. The AND circuit 146 has its output connected through a lead 147, a driver 148, and a lead 150 with electromagnetic switches 152 and 154 (see FIG. 6).

Card sensor 70 (photo device No. 1) is connected through an input lead 155 with an inverter 156. The inverter 156 has an output lead 158 by means of which the inverter is connected with a delay circuit 160 and an AND circuit 162. The AND circuit 162 also has the lead 136 as an input. The delay circuit 160 has an output lead 164 by means of which the delay circuit 160 is connected with an inverter 165, the output of which is applied to the AND circuit 140. Lead 164 also applies the output of the delay circuit 160 to an OR circuit 166. The OR circuit 166 has an output lead 168 constituting an input to the AND circuit 146, and the output lead 147 of the AND circuit 146 also constitutes an input to the OR circuit 166.

Figure 6:
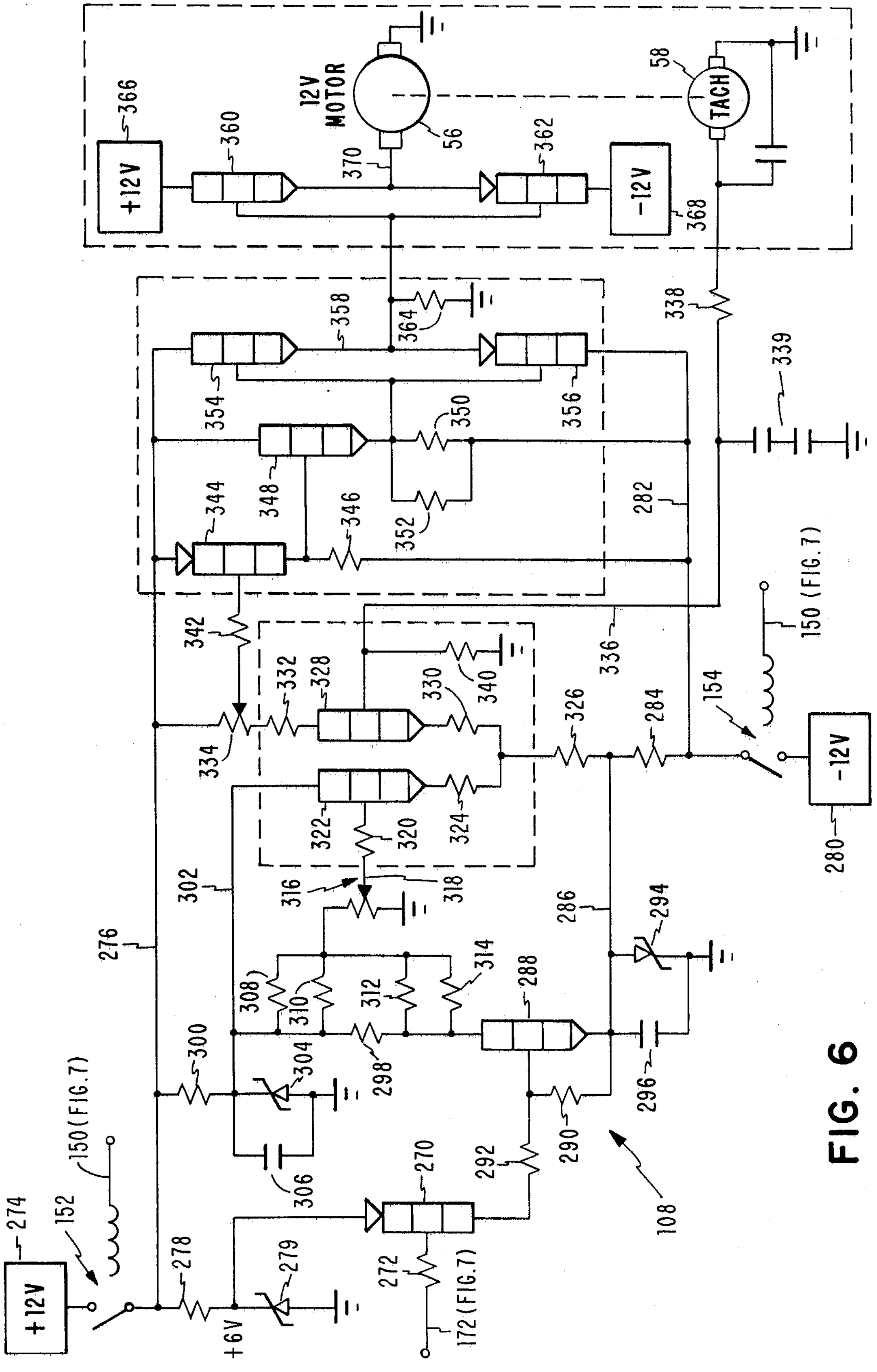
FIG. 6 is a diagramm of motor speed and direction control logic.

The AND circuit 162 has its output connected with the reset input terminal of a trigger 170, and the negative output of the trigger 170 is connected by means of a lead 172 with the motor controlling circuitry of FIG. 6. Lead 168 is connected to the DC reset input terminal of trigger 170.

Card sensor 74 (photo device No. 2) is connected by means of a lead 173 with an inverter 174, and the inverter 174 has its output connected with an AND circuit 176 which also has the lead 133 as an input. The output of the AND circuit 176 is connected with the N set and reset terminals of a trigger 178. The positive output of the trigger 178 is on lead 122 and the negative output of the trigger 178 is on the lead 126. The lead 126 is connected to a reset terminal of the trigger 178 and also with the AND circuit 118. The lead 168 is connected with a minus reset gate terminal of the trigger 178. The lead 122 is connected to a minus set gate terminal of the trigger 178 and is also connected to the N terminals of a trigger 184. The positive output of the trigger 184 is provided on lead 128 which is connected to a minus set gate terminal of the trigger 184. The negative output of the trigger 184 is on the lead 124 which is connected to a reset terminal of the trigger 184 and also with the AND circuit 116. The lead 168, constituting the output of OR circuit 166, is connected with the minus reset gate terminal of trigger 184.

The lead 128 constitutes an input to an AND circuit 188 which has it output on a lead 190 impressed on a single shot 192. The single shot 192 has an output on a lead 194 that is connected with the FIG. 8 circuitry and provides a count of three passes of the card 20 through the transport as will be hereinafter described.

The line 122 constitutes an input to a single shot 196 which provides an output to an AND circuit 198. The AND circuit 198 also has the lead 190 as an input and provides on its output lead 199 a count of one pass of the card 20 through the transport. The lead 199 is also connected with the FIG. 8 circuitry to supply an input thereto. The lead 128 constitutes an input to a single shot 200 supplying its output to an AND circuit 202 which also has the lead 190 as an input. The AND circuit 202 supplies its output on the lead 203. The lead 203 also supplies an input to the FIG. 8 circuitry and provides a count of two passes of the card 20 through the transport.

Card sensor 72 (photo device No. 3) provides an input through a lead 204 to an inverter 206 which has an output lead 208 constituting an input to an AND circuit 210. The AND circuit 210 also has the lead 134 as an input and has its output connected by means of a lead 212 to the set input terminal of the trigger 170. The lead 208 also constitutes an input to an AND circuit 214. A lead 216 constitutes the second iput to the AND circuit 214, and lead 216 constitutes the output of an inverter 218 having the lead 134 as an input. A lead 219 constituting the output of the AND circuit 214 constitutes one of the inputs of the AND circuit 146.

Figure 8:
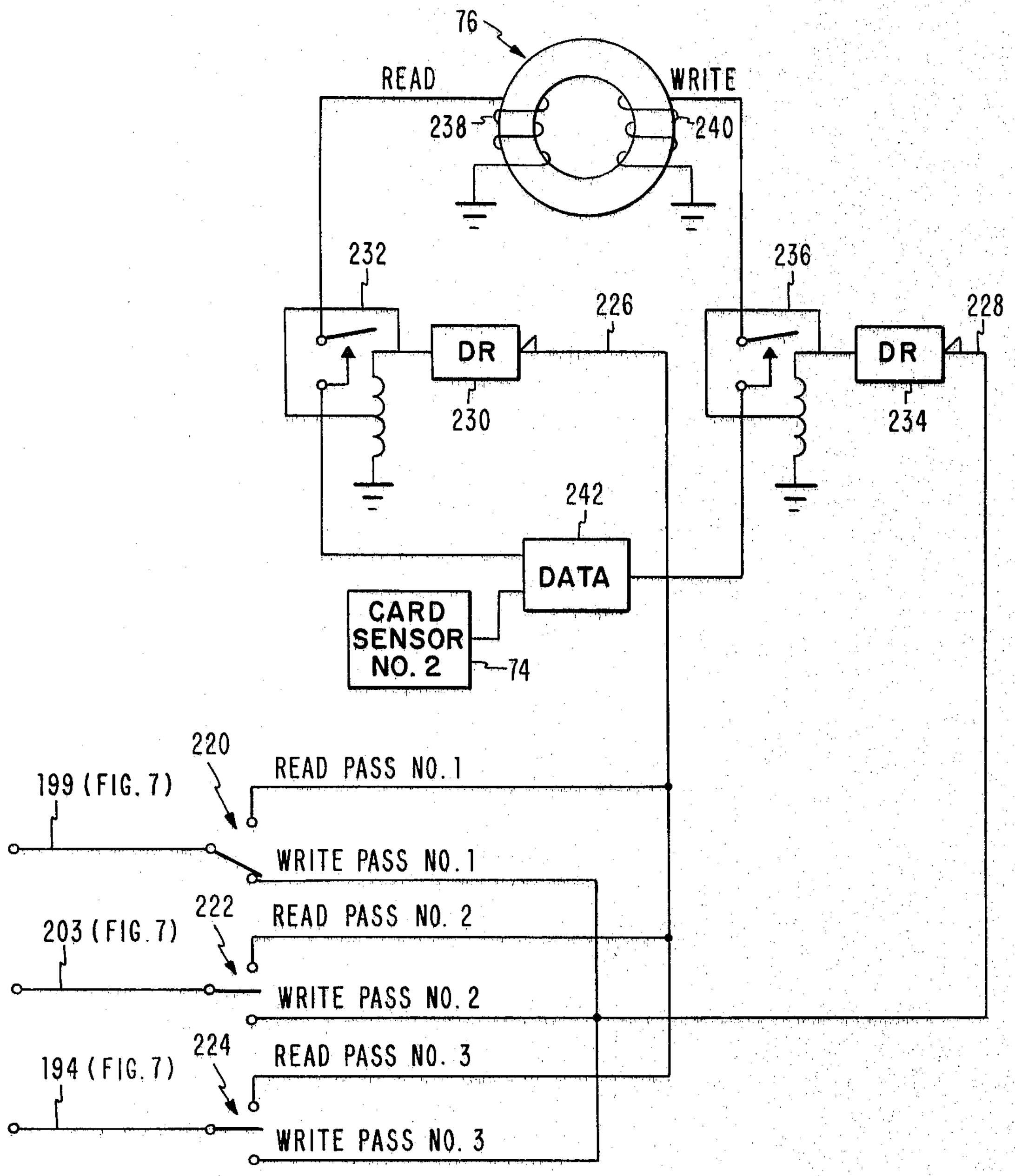
FIG. 8 is a diagram of read/write head controlling logic.

The leads 199, 203 and 194 constitute outputs of the counter 100, and these leads are connected with switches 220, 222 and 224 (FIG. 8). Each of these switches has a read position and a write position, and the read terminals of these switches are all connected to a lead 226, while the write terminals of all of these switches are connected with a lead 228. The lead 226 is connected through a driver 230 with an electromagnetic switch 232, and the lead 228 is connected through a driver 234 with an electromagnetic switch 236. The head 76 has a read coil 238 and a write coil 240, and the switches 232 and 236 are connected between a data source and receiver 242 and the read and write coils 238 and 240 respectively. The data source and receiver 242 may be of any suitable type for supplying write information through the switch 236 to the write coil 240 and for receiving information from the read coil 238 through the switch 232 and storing this information. The data source in receiver 242 is under the control of card sensor 74 so that the data source and receiver 242 may be in condition to receive and retain the information read from coil 238 and to supply information to the write coil 240.

The servo system for controlling the motor 56 under the control of the signals on the leads 150 and 172 is illustrated in FIG. 6. The servo system comprises a transistor 270 connected with the lead 172 through a resistor 272. A potential is applied onto the transistor 270 from a positive voltage source 274 which is connected to a lead 276 by means of the electromagnetic switch 152. The lead 276 is connected with the transistor 270 through a resistor 278, and a grounded zener diode 279 is connected to the junction between the transistor 270 and the resistor 278. A minus voltage is also applied onto the transistor 270, at times, this being from a negative voltage source 280. The voltage source 280 is connected through the electromagnetic switch 154 with a lead 282. A resistor 284 connects the lead 282 with a lead 286 which is connected with a transistor 288. A resistor 290 bridges the emitter and base of transistor 288, and a resistor 292 connects the base of transistor 288 with the transistor 270. A zener diode 294 and a condenser 296 connect ground with the lead 286.

The collector of transistor 288 is connected through resistors 298 and 300 with the lead 276, and a lead 302 is connected to the junction between resistors 298 and 300. A zener diode 304 and a condenser 306 connect lead 302 with ground. A voltage dividing network is connected across resistor 298, and this comprises resistors 308, 310, 312, and 314. A potentiometer 316 is connected to the ends of resistors 308, 310, 312 and 314. The winding of the potentiometer 316 is grounded as shown, and the output of the potentiometer on lead 318 is connected through a resistor 320 with a transistor 322. The transistor 322 has its collector connected with the lead 302 and has its emitter connected through resistors 324 and 326 with the lead 286.

A transistor 328 has its emitter connected through a resistor 330 with the junction between the resistors 324 and 326 and has its collector connected through a resistor 332 and through the winding of a potentiometer 334 with the lead 276. The base of the transistor 328 is connected through a lead 336 having a resistor 338 therein with the tachometer 58. A resistor 340 is connected between the lead 336 and ground.

The slider of the potentiometer 334 is connected through a resistor 342 with the base of a transistor 344. The emitter of the transistor 344 is connected with the lead 276 and its collector is connected through a resistor 346 with the lead 282. The collector of the transistor 344 is connected to the base of a transistor 348. The collector of the transistor 348 is connected to the lead 276, and the emitter of the transistor 348 is connected through parallel connected resistors 350 and 352 with the lead 282.

The emitter of transistor 348 is connected to the base of transistors 354 and 356. The collector of transistor 354 is connected to the lead 276, and the collector of the transistor 356 is connected to the lead 282. A lead connects the emitters of the transistors 354 and 356 together and also with the bases of transistors 360 and 362. A resistor connects ground with the lead 358.

A positive voltage source 366 is connected to the collector of the transistor 360, and a negative voltage source 368 is connected to the collector of the transistor 362. A lead 370 connects the emitters of the transistors 360 and 362 with the motor 56.

The electrical circuitry illustrated in FIG. 5, FIG. 6, FIGS. 7*a* and 7*b* and FIG. 8 operates as follows:

It will be assumed that the switch 220 (FIG. 8) is set in its write position and that the switches 222 and 224 are in their central, open positions. The write position of the switch 220 indicates the fact that, in a first pass of a card 20 through the machine, the card 20 shall be written upon. It is assumed that the machine function switch 98 is in its uppermost position at this time, connecting the No. 1 line 110 to voltage source 109 and that the switch 104 is in its uppermost position connecting line 133 with line 134. The switch 104 indicates at which end of the machine the card 20 will exit, with the uppermost position of the switch 104 indicating that the card exists at the rear of the machine. The switch 98 selects the number of passes the card 20 will make in the machine, and the switch 98 in its uppermost position selects one pass of the card through the machine (which may include only a movement in direction A but may also include a reverse movement in direction D). Under these conditions, the AND circuit 116 connected with the switch 98 is initially not satisfied and the AND circuit 116 thus provides a positive output to the OR circuit 130. The inverter 132 thus, at this time, produces a positive signal on line 133.

When card 20 is inserted far enough into the machine through slot 96 to cover photo device No. 1 (sensor 70), this sensor produces a minus signal on lead 155. The inverter 156 then produces a plus signal on line 158 which is applied to AND circuit 162. The other input to AND circuit 162 has a plus signal on it from voltage source 137, and AND circuit 162 is thus satisfied at this time. The AND circuit 162 at this time produces a minus output on the reset terminal of the trigger 170. Trigger 170 is thus in reset state, and a positive output is thus applied onto lead 172 for application to the circuitry 108 shown in FIG. 6. A plus signal on the lead 172 indicates that the motor 56 shall run in the forward direction B.

The positive signal on lead 158 produced by a covering of the sensor 70 also has the effect of closing the switches 152 and 154 in the FIG. 6 circuitry. The delay circuit 160 having the lead 158 as an input at this time provides a negative signal on lead 164 which constitutes an input to OR circuit 166. The OR circuit 166 thus provides a positive output applied to AND circuit 146, and the other inputs to the AND circuit 146 at this time are positive. A minus signal is thus produced by the AND circuit 146 on lead 147, and the driver 148 provides a plus signal on lead 150 causing the electromagnetic switches 152 and 154 to close. Thus the + 12 volt and − 12 volt sources 274 and 280 are connected at this time with the rest of the FIG. 6 circuitry. The negative signal on the lead 147 is applied to the OR circuit 166 maintaining the plus signal on lead 150, the circuits 166 and 146 thus functioning as a latch.

The positive signal on the lead 172 connected to the FIG. 6 circuitry causes the transistor 270 to decrease in conduction. The point between the resistors 290 and 292 thus becomes more negative, and the conduction in transistor 288 decreases. Therefore, the current through the voltage divider network consisting of resistors 298, 308, 310, 312 and 314 decreases. This increases the current flow through the winding of the potentiometer 316, applying a more positive potential to the transistor 322. The current flow through transistor 322 thus increases, and this causes a decrease in conduction of current through the transistor 328. This increases the voltage across the winding of the potentiometer 334 and causes a decrease in conduction through transistor 344. An increase in the negative potential at the upper end of resistor 346 is thus caused, and a decrease in current conduction takes place through transistor 348. This increases the negative potential on transistor 356 from the emitter of transistor 348, and the current flow through transistor 356 increases. Transistor 360 then is caused to turn on and conduct, and this causes the motor 56 to run in the forward direction. The card 20 is then moved by the roll 54 forwardly through the machine in the direction A.

The speed of the motor is governed by the tachometer 58 which is driven from the motor 56. The tachometer feeds back a signal on the line 336 through the resistor 338 and capacitor 339 filter network. This is a plus signal and is applied on to the transistor 328, tending to cause an increase in conduction through transistor 328. This decreases the potential applied on to the transistor 344, causing it to increase in its conduction. Thus the conduction through transistor 348 increases, causing the conduction through transistor 356 to decrease. This causes a decrease in conduction through transistor 360, decreasing the current through the motor 56.

The increasing current flow through the motor 56 as first described is continued until the output of the tachometer 58 reaches a balance point with the setting of the potentiometer 316, which is the speed controlling element of the circuitry. When the outputs of the tachometer 58 and the speed controlling potentiometer 316 are equal in effect, then the motor current is decreased as just described by increasing the conduction through transistors 344 and 348 thus decreasing the conduction through transistors 360 and 356. Thus the motor is maintained at the set constant speed determined by the setting of potentiometer 316.

As the card 20 proceeds in the forward direction A through the machine, with the motor 56 running at the constant speed in the forward direction, the card 20 will cover the intermediate sensor 74 (photo device No. 2). Coverage of the sensor 74 has the effect of causing a reading or writing to occur by means of the head 76; in this case the head is caused to have a writing action, since the switch 220 is in its lower write position. The signal on line 173 connected with the sensor 74 at this time goes negative, and the inverter 174 generates a positive signal which is applied on to the AND circuit 176. A plus signal at this time is present on the line 133, as previously mentioned, and the AND circuit 176 is thus satisfied, producing a negative signal at its output. The negative signal from the AND circuit 176 triggers the trigger 178, causing the trigger output on lead 122 to go positive. The plus signal on lead 122 fires the single shot 196, and this produces a plus pulse which is applied onto the AND circuit 198. Lead 190 has a positive signal level on it at this time, and the AND circuit 198 is thus satisfied. A negative pulse is thus produced on the lead 199 which is connected with the switch 220 (FIG. 8). The counter 100 now, under these conditions, contains a one count, and the signal on lead 199 indicates that the card is in its first pass through the machine.

The switch 220 has been previously set into its lowermost write position, and the negative pulse on lead 199 is thus applied through the lead 228 onto the driver 234. The output of the driver 234 closes the electromagnetic switch 236 which connects the data source 242 with the write coil 240 of the head 76. Card sensor 74 is connected with the data source 242, and thus the information in the data source 242 is written by the head 76 onto the magnetic stripe 24 under the control of the sensor 74 as the card 20 passes through the machine in the direction A.

If it were desired to read information from the magnetic stripe 24 in lieu of writing information thereon, during this first pass of the card 20 through the machine; the switch 220 would be in its uppermost read position. In this case, the pulse on the lead 199 would be applied onto the driver 230, closing the electromagnetic switch 232. This would have the effect of connecting the read coil 238 of the head 76 with the data source and receiver 242.

The card 20 continues to move in the direction A through the machine until eventually the card covers photo device No. 3, sensor 72. It is assumed that the switch 98 is set in its uppermost position for one card pass through the machine and the switch 104 is set in its uppermost position for causing the card to exit from the machine at the rear end of the card transport. Sensor 72, on being covered by the card 20, produces a negative signal on lead 204 and applied to inverter 206 so that the inverter 206 provides a positive signal on its output lead 208. The positive signal on lead 208 is applied to the AND circuit 214, and the signal on line 216 is also positive at this time, so that the AND circuit 214 is satisfied and provides a negative signal on output lead 219.

The signal level on lead 216 is positve at this time, since the switch 98 is in its uppermost position indicating one desired pass of the card 20 through the machine. A positive signal level is thus present on lead 110, and the signal on lead 122 is also positive at this time since trigger 178 is in set condition. The signal present on line 124 is positive at this time, since the trigger 184 has not thus far been set; and, therefore, the AND circuit 116 is satisfied, producing a minus signal which is applied onto OR circuit 130. OR circuit 130 produces a positive output signal which is applied to inverter 132 producing a minus signal on lead 133. The minus signal on lead 133 is inverted by inverter 218 so as to provide the positive signal on lead 216.

The negative signal on lead 219 from AND circuit 214 has the effect of disabling the AND circuit 146. Thus the signal on lead 147 goes plus, and the driver 148 is thus rendered ineffective to provide a positive output signal on lead 150. The electromagnets 152 and 154 are thus disabled, cutting off the voltage sources from the motor control circuit of FIG. 6 and causing the motor 56 to cease operation. The card 20 then protrudes from the rear of the machine and may be taken by hand from the machine.

The switch 104, when moved into its downward position, causes the motor 56 to reverse, so that the card 20 instead exits from the front of the machine; and reversal of card motion occurs in particular when the sensor 72 is covered by the card. When sensor 72 is covered by the card 20, a negative signal is produced on lead 204, causing a positive output signal on lead 208, but AND circuit 214 is not satisfied and a minus signal is not generated on line 219 which would disenable the latch provided by the AND circuit 146 and OR circuit 166. A plus signal then continues to exist on line 150 so that the electromagnetic switches 152 and 154 remain closed, continuing to supply EMF to the motor drive circuitry 108. AND circuit 214 is not satisfied at this time, since voltage source 135 maintains a positive signal level on lead 134 and thus a negative signal level on lead 216 constituting an input to AND circuit 214.

The signal on line 208 is also applied onto AND circuit 210. The signal on line 134, also constituting an input to the AND circuit 210, is also plus, due to the EMF source 135. The AND circuit 210 is thus satisfied at this time, producing a minus signal on the lead 212, and this causes the trigger 170 to be set and provide a minus signal on lead 172. The minus signal on lead 172 controls the FIG. 6 circuitry to reverse motor 56. In particular, this signal causes increases in conduction through transistors 270 and 288. An increase in potential is thus provided on to the transistor 322 through the voltage dividing network including resistors 308, 310 etc. and the potentiometer 316 so as to cause an increase in conduction through transistor 328 and corresponding increases in conduction through the transistors 344 and 348, Conduction through the transistor 356 thus discontinues, and the transistor 354 is turned on. The current conducted through transistor 354 causes the transistor 362 to conduct, turning off transistor 360; and the negative voltage from source 368 applied to motor 56 causes the motor to reverse and run in the reverse direction C. The card 20 then reverses direction along with the motor and is propelled toward the entrance end of the card channel 38 in direction D.

The tachometer 58 again generates a voltage dependent on speed of the motor 56 which is compared by means of the transistors 322 and 328 with the output of the potentiometer 316, and the motor 56 is thus brought up to speed and is maintained at this speed similar to the action of the tachometer 58 during forward rotation of the motor shaft.

The card 20 is now moving in direction D toward the front of the machine, and during this movement there is no reading or writing by the head 76 because, in particular, the trigger 178 and counter 100 still contain the count of one, and the single shot 196 has finished firing. Therefore, the AND circuit 198 is not satisfied, and there is no negative potential applied to switch 220 by means of lead 199. Both of the drivers 230 and 234 are thus disabled and both of the switches 232 and 236 are open so that the head 76 is ineffective for either reading or writing.

The card 20 continues its motion in the reverse direction (direction D as seen in FIG. 1), and the card finally is ejected through the slot 96 and the motor 56 stops. It is assumed that the switch 98 is in its uppermost position corresponding to one pass of the card through the machine (which may include both a forward movement A and a reverse movement D) and the swtich 104 is in its lowermost position calling for a front exit by the card. The AND circuit 116 still remains enabled since the switch 98 is in its uppermost position and the counter 100 indicates that only one pass of the card has been made through the machine. Under these conditions, a positive signal exists on the lead 122, since trigger 170 is in set condition. Under these conditions also, a positive signal exists on the lead 124, since the trigger 184 has not so far been set. The signal from the AND circuit 116 passes through the OR circuit to the inverter 132. The inverter 132 thus applies a negative signal through lead 133 to the switch 104, and the negative signal is applied through the lead 136 onto the inverter 138. The output of the inverter 138 thus, at this time, is positive; and the AND circuit 140 thus at this time is made. The other input to the AND circuit 140 is also positive at this time, since the No. 1 photo device, sensor 70, produces a signal on inverter 156; and the signal from inverter 156 acts on delay 160 to produce a signal on lead 164 applied onto inverter 165, producing the second positive input to AND circuit 140. The output of AND circuit 140 passes through the two delay circuits 142 and 144. The delay circuits 142 and 144 are adjusted so as to provide a delay for the duration of time required for the card 20 to return from its position covering sensor 72 to its position covering sensor 70. When the delay of circuits 143 and 144 is timed out, the motor start latch consisting of the AND circuit 146 and OR circuit 166 is dropped by the disabling of the AND circuit 146. The signal on line 147 then becomes positive, producing a negative signal on line 150 and thereby causing the opening of the electromagnetic switches 152 and 154. The motor 56 then stops, and the card 20 protrudes through the slot 96 at the front of the machine where it may be grasped by the operator.

Now, it will be assumed that it is desired that the card shall pass through the machine with more than one pass. Switch 98 will thus be set in its central position corresponding to two passes of the card through the machine or will be set in its lowermost position corresponding to three passes of the card through the machine. In either of these cases, photo cell No. 1 (sensor 70) is effective for causing a reversal of the motor 56 and of the card 20 so that the card moves in its original direction (direction A). The signal on the motor control lead 150 is not interruped under these conditions when the card 20 reaches the limit of its movement covering the sensor 70, since the switch 98 is not in its upper position and the AND circuit 116 is therefore not satisfied at this time. Therefore, there can at this time be no signal on the lead 219 or from the delay circuits 142 and 144 opening the latch consisting of AND circuit 146 and OR circuit 166.

The card 20, in moving toward the slot 96 in direction D covers the sensor 70, and this causes the motor 56 to reverse, with the switch 98 being out of its upper position. Under these conditions, the signal on line 155 from the sensor 70 applies a signal on the inverter 156 which in turn provides a positive signal on lead 158. The signal on line 158 has the effect of enabling the AND circuit 162. The line 136 carries a plus potential due to the voltage source 137, so that both inputs of the AND circuit 162 are at a positive potential. The AND circuit 116 is not enabled, since the switch 98 is not in the upper position, and therefore there can be no resulting signal on line 133 that would change the potential of the line 136, regardless of the position of the switch 104. The AND circuit 162 therefore at this time provides a negative signal on the lower reset terminal of the trigger 170 so that the trigger 170 is reset and provides a plus signal on its output lead 172. The plus signal on the lead 172 controls the FIG. 6 circuitry at this time in the same manner as at the time the card 20 was originally inserted into the machine, causing the motor 56 to run in the forward direction B and move the card 20 forwardly through the machine in the direction A.

When the card 20 moves forwardly in the machine sufficiently to again cover the sensor 74, the sensor 74 functions again, similarly as when the card 20 originally covered the sensor 74 in its first pass, to provide a reading or a writing action. At this time, however, the reading or writing action is under the control of the switch 222 which controls the reading and writing action during the second pass of the card 20 through the machine. For this purpose, the switch 222 is provided with a second pass signal from the counter 100 and particularly from the lead 203 and AND circuit 202.

The photo device No. 2 (sensor 74) has the effect of causing the counter 100 to count from one to two, corresponding to the second pass of the card 20 through the machine. As the card 20 covers the sensor 74 in moving in the direction A through the machine for the second time, signals are provided by the inverter 174 and AND circuit 176 to the trigger 178 in the same manner as in the case in which the sensor 74 was covered by the card 20 in moving in the direction A through the machine for the first time. The trigger 178 is then changed in state, from a set state to a reset state, by the application of the minus signal from the AND circuit 176 to the N terminals of the trigger 178. The potential on the lead 122 changes from plus to minus, and the changing signal applied to the N terminals of the trigger 184 changes the state of the trigger 184 from a reset condition to a set condition, so that a positive signal exists on the lead 128. This signal fires the single shot 200, and the AND circuit 202 is enabled at this time to provide a signal on the lead 203 indicating that the card is then in its second pass through the machine. The AND circuit 188 is not satisfied at this time, so that the lead 190 carries a positive signal; and the AND circuit 202 is thus satisfied at this time. The signal on the lead 203 indicating the second pass of the card 20 through the machine is applied to the switch 222, as previously discussed, causing a reading or a writing action by the head 76 as the card passes through the machine in its second pass in the direction A.

The card 20 either passes out of the machine at the rear end of the machine or else moves back again toward the slot 96 upon a motor reversal in the same manner as these actions ocurred during the first pass of the card 20 through the machine. In the second pass of the card 20, however, the AND circuit 118, in lieu of the AND circuit 116, is enabled to provide a signal through the circuits 130 and 132 and on the lead 133 for application to the switch 104 which causes the card 20 to either front exit or rear exit from the machine.

When three passes of the card 20 are desired, the switch 98 is moved into its lowermost position so as to complete a circuit with lead 114. On the third pass of the card 20 through the machine, moving in the direction A, sensor 74 will again be effective to actuate the counter 100, causing the counter to count from its two count to its three count. In this case, signals from the sensor 74 pass through the inverter 174 and AND circuit 176 for application to the trigger 178, and the trigger 178 is then again set. The trigger 184 remains set, since the trigger 184 is only changed in state by an application of voltage to the N terminals thereof from plus to minus; and therefore, both of the triggers 178 and 184 are in set condition under these circumstances. Positive signals are thus applied to the AND circuit 188 (from leads 122 and 128), and the AND circuit 188 is enabled, providing a minus signal on its output lead 190. The signal shot 192 then fires, producing a signal on lead 194. The lead 194 is connected with the switch 224; and, if switch 224 is set in its read position, a reading by the head 76 takes place, similarly as under control of either the switches 220 and 222. Conversely, if the switch 224 is set in its write position, a writing action by the head 76 takes place on the third pass of the card 20 through the machine, moving in the direction A.

The AND circuit 120 is enabled for the third pass of the card 20 through the machine. In this connection, it will be noted that the AND circuit 120 has inputs from the switch 98, lead 122 and lead 128 as inputs. The switch 98 provides a continuing signal, assuming that the switch 98 is in its three pass position in connection with the lead 114; the lead 122 provides a signal during and after the first pass of the card 20 through the machine; and the lead 128 provides a signal during and after the second pass of the card 20 through the machine. The AND circuit 120 is thus satisfied during the third pass of the card through the machine, thus producing a minus signal on the lead 133 by means of the OR circuit 130 and inverter 132. The minus signal on the lead 133 is applied to the switch 104 which functions as previously described to either cause a rear exit or a front exit of the card 20 from the machine, depending on the position of the switch 104; but, under these conditions, the card 20 will exit after the third pass of the card through the machine rather than after the first or second pass of the card through the machine.

It is thus apparent that the counter 100 which includes the single shots 196, 192 and 200, AND circuits 198, 188 and 202 and triggers 178 and 184 produces signals indicative of the first pass, the second pass or the third pass of the card through the machine in the direction A. The counter is under the control of the second photo device (sensor 74) so as to raise these signals as the card moves in registry with the sensor 74. As described, the one, two and three pass signals are respectively raised by the counter 100 on lines 199, 203 and 194. These lines are respectively applied to the switches 220, 222 and 224; and, depending on the setting of these latter switches, a read or a write action will take place on the passage of the card through the machine in its respective passes when moving in the direction A.

The setting of the switch 98 controls the machine in such a manner as to terminate the passage of the card through the machine at the end of a first pass, a second pass or a third pass. The switch 98 is effectively in series with the switch 104 (by means of AND circuits 116, 118 and 120, OR circuit 130 and inverter 132), so that the switch 104 causes a front exit or a rear exit by the card from the machine at the end of one of these passes depending on the setting of the switch 104.

The speed of the motor 56 may be adjusted by adjusting the setting of the potentiometer 334. The speed of magnetic encoding and the speed of reading may thus be matched with the speed at which the particlar data unit 242 being used may accept or discharge data.

What is claimed is:

1. A machine for transferring information with respect to a document card of the type having a stripe of magnetic material thereon, comprising a transport for the card including a pair of rolls in constant nipped relationship between which the card may move;

a reversible electric motor in constant driving relationship with one of said rolls for rotating the roll and for moving a document card in forward and reverse directions along said transport due to the card driving action of said rolls;

a head in the path of movement of the card in the transport and positioned approximately in alignment with said rolls transversely of said transport and in alignment longitudinally of said transport with the magnetic stripe on the card for transferring information with respect to the magnetic stripe as the card passes over the head in moving in said transport;

first and second photosensors disposed at opposite ends of said transport for sensing the opposite ends of said card as it moves along said transport;

means providing an electromotive force to and for so controlling said motor so that it drives said rolls at substantially constant speed;

means connecting each of said sensors with said motor for reversing the direction of drive of said motor and direction of rotation of said rolls for thereby reversing the direction of movement of said card in said transport as the card moves into registry with each sensor whereby the card moves through the transport first in a first pass in a forward direction, then in the reverse direction, and finally in a second pass in the forward direction, all the while being gripped between and being propelled by said rolls; and means for rendering said head effective for transferring information on said passes of the card in the forward direction and for rendering the head ineffective for transferring information on movement of the card in the reverse direction;

said machine including a third photosensor in approximate alignment with said head and said rolls transversely of said transport and electrically connected with said head so as to cause said head to transfer information with respect to said magnetic stripe as the card moves in its said passes in the forward direction in said transport with its magnetic stripe passing over said head.

2. A machine for transferring information as set forth in claim 1 and including a pair of document card guide rails on opposite sides of the transport for accurately guiding the card as it moves through the transport, one of said rails being fixed and the other of said rails having a plurality of springs effective on the rail so as to hold the card firmly against the fixed rail as it moves in the transport.

3. A machine for transferring information with respect to a document card of the type having a stripe of magnetic material thereon, comprising a transport for the card including a pair of rolls in constant nipped relationship between which the card may move;

a reversible electric motor in constant driving relationship with one of said rolls for rotating the roll and for moving a document card in forward and reverse directions along said transport due to the card driving action of said rolls;

a head in the path of movement of the card in the transport and positioned approximately in alignment with said rolls transversely of said transport and in alignment longitudinally of said transport with the magnetic stripe on the card for transferring information with respect to the magnetic stripe as the card passes over the head in moving in said transport;

first and second photosensors disposed at opposite ends of said transport for sensing opposite ends of said card as it moves along said transport;

means providing an electromotive force to and for so controlling said motor so that it drives said rolls at substantially constant speed;

means connecting each of said sensors with said motor for reversing the direction of drive of said motor and direction of rotation of said rolls for thereby reversing the direction of movement of said card in said transport as the card moves into registry with each sensor whereby the card moves through the transport first in a first pass in a forward direction, then in the reverse direction, and finally in a second pass in the forward direction, all the while being gripped between and being propelled by said rolls; and means for rendering said head effective for transferring information on said passes of the card in the forward direction and for rendering the head ineffective for transferring information on movement of the card in the reverse direction;

said machine including control means having a dual condition control switch means and effective on said motor and over-controlling the motor with respect to the action of either of said photosensors for causing the motor to continue the drive of the card in either the forward or in the reverse direction until the card exits from the transport in either the forward or reverse direction depending on the adjusted condition of said switch means.

* * * * *